United States Patent
Kawanishi (10) Patent No.: US 8,229,279 B2
(45) Date of Patent: Jul. 24, 2012

(54) RECORDING DEVICE AND RECORDING METHOD ALLOWING RECORDING OVER TIME LIMIT

(75) Inventor: Yasuyuki Kawanishi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1327 days.

(21) Appl. No.: 11/868,196

(22) Filed: Oct. 5, 2007

(65) Prior Publication Data

US 2008/0260356 A1 Oct. 23, 2008

(30) Foreign Application Priority Data

Oct. 12, 2006 (JP) ................................. 2006-278767

(51) Int. Cl.
*H04N 9/80* (2006.01)
*H04N 5/93* (2006.01)
*G11B 27/00* (2006.01)
*H04N 7/10* (2006.01)
*H04N 7/025* (2006.01)
*H04N 5/445* (2006.01)
*G06F 3/00* (2006.01)
*G06F 13/00* (2006.01)

(52) U.S. Cl. ........ 386/278; 386/239; 386/248; 386/250; 386/251; 386/286; 386/290; 725/32; 725/34; 725/42

(58) Field of Classification Search .................. 386/239, 386/248, 249, 250, 251, 278, 286, 290; 725/32, 725/36, 42

See application file for complete search history.

(56) References Cited

U.S. PATENT DOCUMENTS 6,393,158 B1 * 5/2002 Gould et al. ................... 382/254
6,766,523 B2 * 7/2004 Herley ............................ 725/19

(Continued)

FOREIGN PATENT DOCUMENTS

JP 2001-45425 2/2001

(Continued)

OTHER PUBLICATIONS

Patent Abstracts of Japan for Japanese Publication No. 2003-199012, Publication date Jul. 11, 2003 (1 page).

(Continued)

*Primary Examiner* — Tran Thai Q
*Assistant Examiner* — Daquan Zhao
(74) *Attorney, Agent, or Firm* — Osha Liang LLP (57) ABSTRACT

A recording control unit records program data for a second time period, from the time point the second time period before the lapse of a first time period from the start of recording, not only under a first title but also at a start portion of a second title. A combining unit identifies identical CM portions in the program data recorded redundantly under the first and second titles, connects the portion immediately preceding the start of the identified CM portion of the first title to the portion immediately succeeding the end of the identified CM portion of the second title, to form one title. An editing unit edits the program data to make shorter the length of the combined title, when the time of program data recorded under the combined title exceeds the first time period.

8 Claims, 6 Drawing Sheets

U.S. PATENT DOCUMENTS

| | | | |
|---|---|---|---|
| 7,096,482 B2 * | 8/2006 | Fujita et al. | 725/32 |
| 7,110,659 B2 * | 9/2006 | Fujie et al. | 386/249 |
| 7,480,445 B2 * | 1/2009 | Yamamoto et al. | 386/249 |
| 7,694,318 B2 * | 4/2010 | Konig et al. | 725/32 |
| 7,805,052 B2 * | 9/2010 | Nakamura et al. | 386/326 |
| 7,860,369 B2 * | 12/2010 | Takahashi et al. | 386/343 |
| 2002/0157093 A1 * | 10/2002 | Akiyama et al. | 725/32 |
| 2005/0002644 A1 * | 1/2005 | Nakamura et al. | 386/52 |
| 2006/0248439 A1 * | 11/2006 | Takahashi et al. | 715/500 |
| 2007/0136741 A1 * | 6/2007 | Stattenfield | 725/32 |

FOREIGN PATENT DOCUMENTS

| | | |
|---|---|---|
| JP | 2003-199012 | 7/2003 |
| JP | 2005-174390 | 6/2005 |

OTHER PUBLICATIONS

Patent Abstracts of Japan for Japanese Publication No. 2005-174390, Publication date Jun. 30, 2005 (1 page).

Patent Abstracts of Japan for Japanese Publication No. 2001-045425, Publication date Feb. 16, 2001 (1 page).

* cited by examiner

RECORDING DEVICE AND RECORDING METHOD ALLOWING RECORDING OVER TIME LIMIT

BACKGROUND OF THE INVENTION

1. Field of the Invention

The present invention relates to device and method of recording and, more specifically, to device and method of recording in which program data to be recorded under one title is limited in time.

2. Description of the Background Art

Conventionally, a recording device has been provided in which time period that can be recorded under one title is limited to a prescribed time period, in connection with display of recording time or reproduction time.

When programmed recording (timer recording) is designated exceeding the prescribed time period in such a recording device, it is possible to perform designated recording by dividing into a plurality of titles for recording. Here, a problem that frames are dropped at the portion connecting the divided portions, that is, the problem of frame dropping, arises.

In this regard, according to Japanese Patent Laying-Open Nos. 2001-045425, 2005-174390 and 2003-199012, when divided recording is done, neighboring portions are recorded in redundant manner, so that the connection between divided portions is less noticeable.

The technique according to Japanese Patent Laying-Open Nos. 2001-045425 and 2003-199012, however, is disadvantageous as overlapped portions remain on the disk, wasting disk capacity.

According to Japanese Patent Laying-Open No. 2005-174390, the overlapped portions (margin) are erased and a plurality of files are combined to form one file. This reference, however, does not disclose how to figure out the margin portion (that is, which frame is a margin) and to combine without frame dropping.

SUMMARY OF THE INVENTION

An object of the present invention is to provide a recording device and a recording method that allow recording without wasting the disk capacity and without causing frame dropping, even when the time period that can be recorded under one title is limited within a prescribed time period and programmed recording over the time limit is designated.

The present invention provides a recording device in which time of program data to be recorded under one title is limited within a first time period, including: a receiving unit receiving the program data from a broadcast station; an operation input unit receiving a user operation; a storage unit having areas for storing at least two titles, and storing the received program data as data of either title; a recording control unit for recording, when the user sets programmed recording of a recording time longer than the first time period, the program data for the first time period from the start of recording time-sequentially under a first title, and recording the program data within the first time period minus a second time period, from the time point when the first time period elapsed from the start of recording, time-sequentially under a second title; a combining unit combining the first title and the second title to form one title; and an editing unit for making shorter the length of the combined title, if the time of program data recorded under the combined title exceeds the first time period; wherein the recording control unit records program data for the second time period from the time point the second time period before the lapse of the first time period from the start of recording, not only under the first title but also at a start portion of the second title; the program data received by the receiving unit includes CM portions, with time interval between the CM portions being equal to or shorter than the second time period; the combining unit identifies identical CM portions in the program data recorded redundantly under the first title and the second title, and forms the one title by connecting a portion immediately preceding the start of the identified CM portion in the first title to a portion immediately succeeding the end of the identified CM portion in the second title; the editing unit identifies a CM portion of the combined title removes the identified CM portion and closes up the removed portion; and the editing unit further removes, when the user designates a portion to be cut of the combined title through the operation input unit, the designated portion from the combined title and closes up the removed portion.

Further, the present invention provides a recording device in which time of program data to be recorded under one title is limited within a first time period, including: a receiving unit receiving the program data from a broadcast station; an operation input unit receiving a user operation; a storage unit having areas for storing at least two titles, and storing the received program data as data of either title; a recording control unit for recording, when the user sets programmed recording of a recording time longer than the first time period, the program data for the first time period from the start of recording time-sequentially under a first title, and recording the program data within the first time period minus a second time period, from the time point when the first time period elapsed from the start of recording, time-sequentially under a second title; a combining unit combining the first title and the second title to form one title; and an editing unit for making shorter the length of the combined title, if the time of program data recorded under the combined title exceeds the first time period; wherein the recording control unit records program data for the second time period from the time point the second time period before the lapse of the first time period from the start of recording, not only under the first title but also at a start portion of the second title; the program data received by the receiving unit includes CM portions, with time interval between the CM portions being equal to or shorter than the second time period; and the combining unit identifies identical CM portions in the program data recorded redundantly under the first title and the second title, and forms the one title by connecting a portion immediately preceding the start of the identified CM portion in the first title to a portion immediately succeeding the end of the identified CM portion in the second title.

Preferably, the editing unit identifies a CM portion of the combined title, removes the identified CM portion and closes up the removed portion.

Preferably, the editing unit removes, when the user designates a portion to be cut of the combined title through the operation input unit, the designated portion from the combined title and closes up the removed portion.

Further, the present invention provides a method of recording in a recording device in which time of program data to be recorded under one title is limited within a first time period, wherein the recording device includes a storage unit having areas for storing at least two titles, and storing the received program data as data of either title; the method including the steps of: receiving, from a broadcast station, program data including CM portions, with time interval between the CM portions being equal to or shorter than a second time period; recording, when the user sets programmed recording of a recording time longer than the first time period, the program data to a time point the second time period before the lapse of the first time period from the start of recording, time-sequentially under a first title; recording the program data for the second time period, from the time point the second time period before the lapse of the first time period from the start of recording, time-sequentially under the first title and time-sequentially under a second title; recording, from the time point when the first time period elapsed from the start of recording, the program data within the first time period minus the second time period, time-sequentially under the second title; identifying identical CM portions in the program data recorded redundantly under the first title and the second title, and forming one title by connecting a portion immediately preceding the start of the identified CM portion in the first title to a portion immediately succeeding the end of the identified CM portion in the second title; and editing to make shorter the length of the combined title, if the time of program data recorded under the combined title exceeds the first time period; wherein at the editing step, a CM portion of the combined title is identified, the identified CM portion is removed and the removed portion is closed up, and when the user designates a portion to be cut of the combined title, the designated portion is removed from the combined title and the removed portion is closed up.

Further, the present invention provides a method of recording in a recording device in which time of program data to be recorded under one title is limited within a first time period, wherein the recording device includes a storage unit having areas for storing at least two titles, and storing the received program data as data of either title; the method including the steps of: receiving, from a broadcast station, program data including CM portions, with time interval between the CM portions being equal to or shorter than a second time period; recording, when the user sets programmed recording of a recording time longer than the first time period, the program data to a time point the second time period before the lapse of the first time period from the start of recording, time-sequentially under a first title; recording the program data for the second time period, from the time point the second time period before the lapse of the first time period from the start of recording, time-sequentially under the first title and time-sequentially under a second title; recording, from the time point when the first time period elapsed from the start of recording, the program data within the first time period minus the second time period, time-sequentially under the second title; identifying identical CM portions in the program data recorded redundantly under the first title and the second title, and forming one title by connecting a portion immediately preceding the start of the identified CM portion in the first title to a portion immediately succeeding the end of the identified CM portion in the second title; and editing to make shorter the length of the combined title, if the time of program data recorded under the combined title exceeds the first time period.

Preferably, at the editing step, a CM portion of the combined title is identified, the identified CM portion is removed and the removed portion is closed up.

Preferably, at the editing step, when the user designates a portion to be cut of the combined title, the designated portion is removed from the combined title and the removed portion is closed up.

According to the present invention, recording without wasting the disk capacity and without causing frame dropping is possible, even when the time period that can be recorded under one title is limited within a prescribed time period and programmed recording over the time limit is designated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments of the present invention will be described with reference to the figures.

(Configuration)

Figure 1:
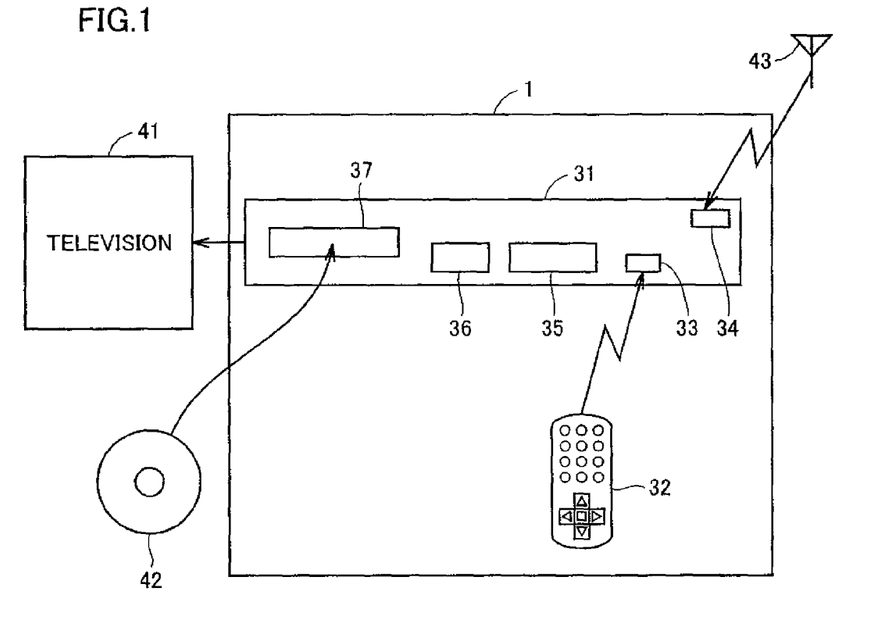
FIG. 1 shows an appearance of the recording device in accordance with an embodiment of the present invention.

FIG. 1 shows an appearance of the recording device in accordance with an embodiment of the present invention.

Referring to FIG. 1, a recording device 1 includes a body 31, and a remote controller 32. Video data output from body 31 is displayed on a television 41.

Body 31 includes a light receiving unit 33 receiving a signal from remote controller 32, an inlet 37 for inserting a DVD (Digital Versatile Disk) 42, a non-volatile memory 35, an HDD (Hard Disk Drive) 36, and a tuner 34 connected to an antenna 43.

Figure 2:
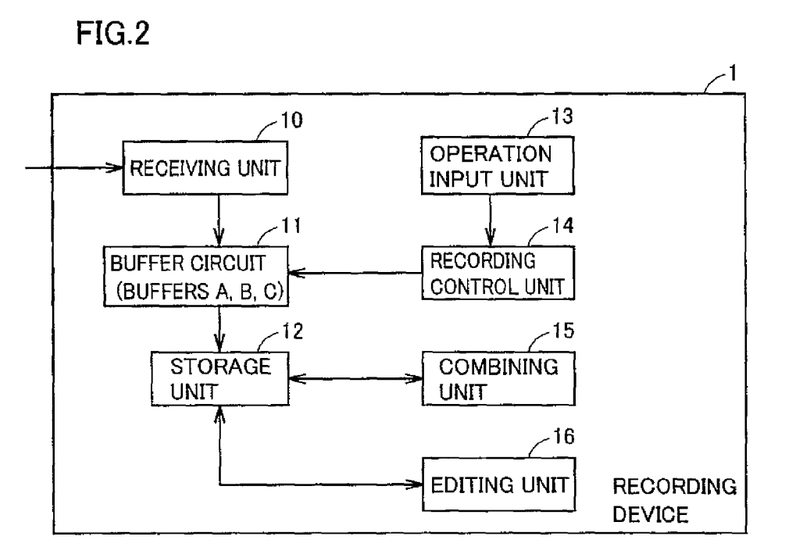
FIG. 2 is a functional block diagram of the recording device in accordance with an embodiment of the present invention.

FIG. 2 is a functional block diagram of the recording device in accordance with an embodiment of the present invention.

Referring to FIG. 2, recording device 1 includes a receiving unit 10, a buffer circuit 11, a storage unit 12, an operation input unit 13, a recording control unit 14, a combining unit 15, and an editing unit 16.

Operation input unit 13 receives a user operation. Operation input unit 13 receives an operation of programmed recording, for example, from the user. Specifically, operation input unit 13 is realized by remote controller 32 and light receiving unit 33 of FIG. 1.

Receiving unit 10 receives program data from a broadcast station and outputs the data to any of buffers A, B and C of buffer circuit 11. The program data transmitted from the broadcast station includes CM portions. Time interval of the CM portions is assumed to be within a second time period. In the present embodiment, the second time period is assumed to be 15 minutes. Specifically, the receiving unit is implemented by tuner 34 of FIG. 1.

Buffer circuit 11 includes three buffers A, B and C. Buffers A, B and C temporarily store the program data transmitted from receiving unit 10, and output the stored program data to any title, that is, storage area for any title in storage unit 12. By way of example, buffer circuit 11 is realized by non-volatile memory 35 of FIG. 1.

Storage unit 12 has areas for storing a plurality of titles and stores the received program data as data of any of the titles. Data included in each title are stored time-sequentially in continuous areas in storage unit 12. Storage unit 12 is implemented by DVD 42 and HDD 36 of FIG. 1.

When the user sets, through operation input unit 13, programmed recording of which recording time exceeds a first time period, recording control unit 14 records the program data by dividing the data to titles A and B. In the present embodiment, the first time period is assumed to be 24 hours. Specifically, recording control unit 14 records the program data of the first time period (=24 hours) from the start of recording time-sequentially under title A, and records the program data of at most the first time period (=24 hours) minus the second time period (=15 minutes), that is, at most 23 hours 45 minutes, from the time point the first time period (=24 hours) elapsed after the start of recording, time-sequentially under title B. Further, recording control unit 14 records the program data from the second time period (=15) before the lapse of the first time period (=24 hours) from the start of recording, for the second time period (=15 minutes), not only under title A but also at the start portion of title B.

Combining unit 15 combines titles A and B to form one title. Specifically, combining unit 15 identifies a CM portion in the portion recorded overlapped in a redundant manner under titles A and B, and connects the portion immediately preceding the start of the identified CM portion of title A to the portion immediately succeeding the end of the identified CM portion of title B, thereby to form one title.

If the time of program data recorded under one title after combining exceeds the first time period, editing unit 16 edits to shorten the length of the combined title. Specifically, editing unit 16 identifies CM portions in the combined title, removes the identified CM portions and closes up the removed portions. As to identification of the CM portion, any known method may be used. By way of example, a method of determining a start or end of a CM when the received television broadcast turns mute, a method of determining a stereo mode portion of television broadcast to be a CM, or a method of determining a CM portion in accordance with luminance and chromatic dispersion of television signal or analogue video signal characteristic such as VPS (Video Program System), may be available.

(Operation)

Figure 3:
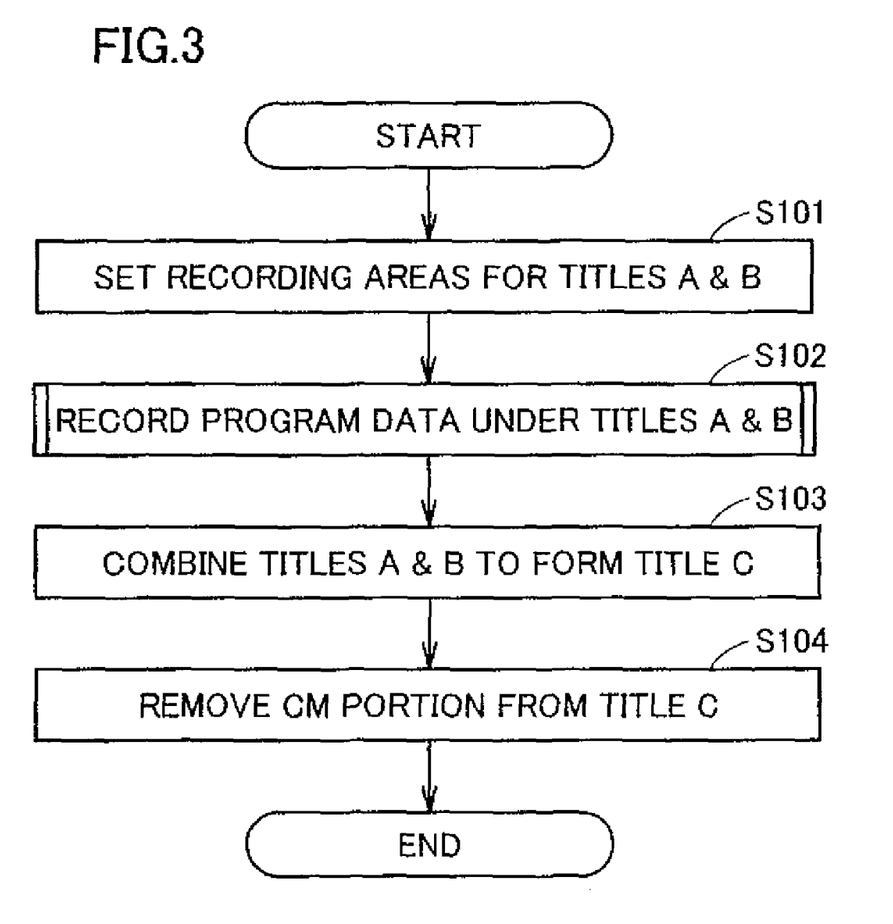
FIG. 3 is a flowchart representing operation procedure of the recording device in accordance with an embodiment of the present invention.
Figure 4:
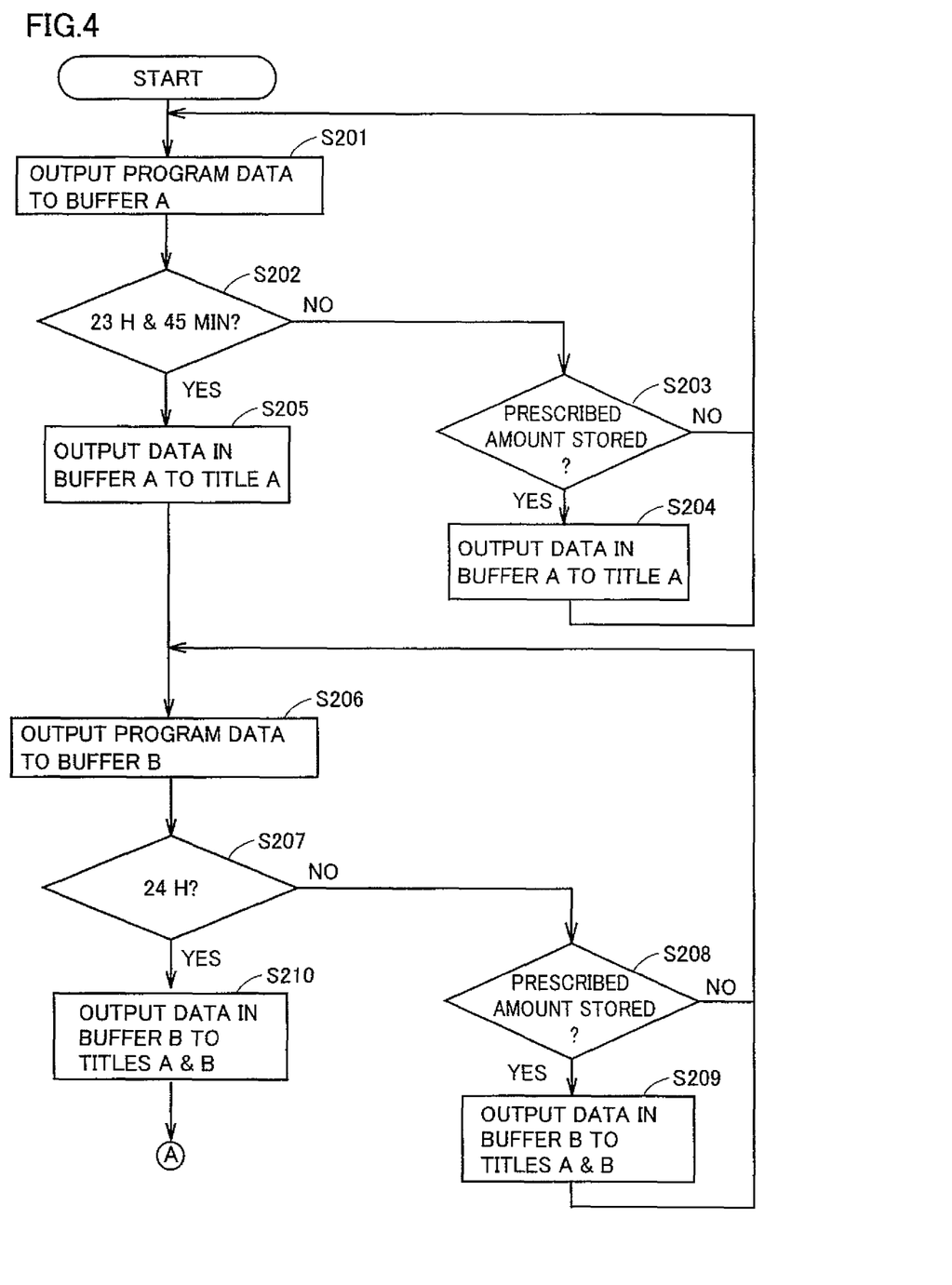
FIGS. 4 and 5 are flowcharts representing detailed procedure of step S102 shown in FIG. 3.
Figure 5:
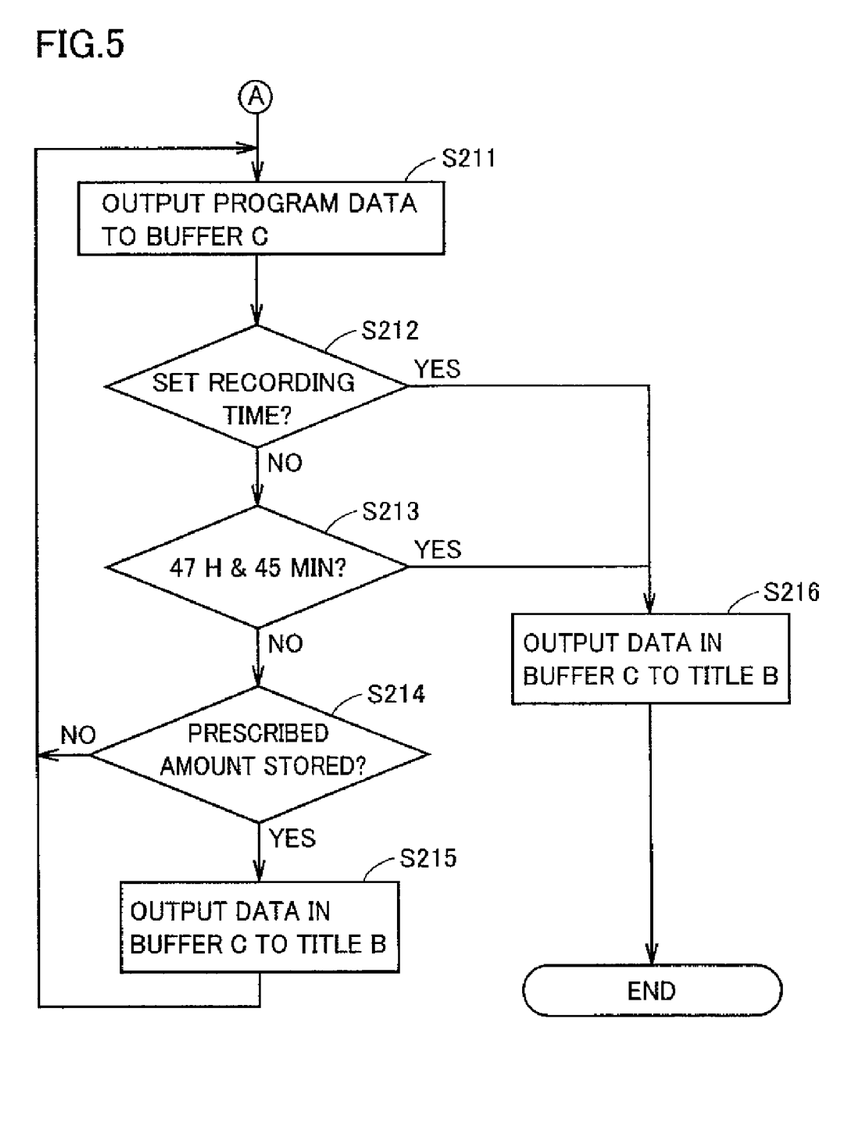

FIG. 3 is a flowchart representing an operation procedure of the recording device in accordance with the present embodiment. FIGS. 4 and 5 are flowcharts representing details of the procedure at step S102 of FIG. 3.

Referring to FIG. 3, first, when the user sets programmed recording of which recording time (for example, 26 hours) exceeds the first time period (=24 hours) through operation input unit 13, recording control unit 14 provides an area for title A of 24 hours in storage unit 12, and provides, in the neighboring area next to the title A area, an area for title B of 24 hours (step S101).

Next, receiving unit 10, buffer circuit 11 and recording control unit 14 receive the program data, and record the data under titles A and B (step S102).

Referring to FIGS. 4 and 5, details of step S102 will be described.

First, receiving unit 10 receives the program data transmitted from the broadcast station, and outputs the received program data to buffer A (step S201).

From the start of recording until the lapse of the first time period (=24 hours) minus the second time period (=15 minutes), that is, from the start of recording until the lapse of (first time period−second time period)=(23 hours and 45 minutes) (NO at step S202), buffer A outputs, every time the amount of stored program data reaches a prescribed amount (YES at step S203), the stored program data to the first portion of un-recorded part of title A (step S204).

Next, at the time point when the first time period (=24 hours) minus the second time period (=15 minutes) elapsed, that is, when (first time period−second time period)=(23 hours and 45 minutes) elapsed from the start of recording (YES at step S202), buffer A outputs the stored program data to the first portion of un-recorded part of title A (step S205).

Also from this time point, receiving unit 10 starts to output the received program data to buffer B (step S206).

Next, until the lapse of the first time period (=24 hours) (NO at step S207), buffer B outputs, every time the amount of stored program data reaches a prescribed amount (YES at step S208), the stored program data to the first portion of un-recorded part of title A and also to the first portion of un-recorded part of title B (step S209).

Next, at the time point when the first time period (=24 hours) elapsed (YES at step S207) from the start of recording, buffer B outputs the stored program data to the first portion of un-recorded part of title A and also to the first portion of un-recorded part of title B (step S210).

Also from this time point, receiving unit 10 starts to output the received program data to buffer C (step S211).

Next, until the lapse of the set recording time (=26 hours) from the start of recording (NO at step S212) and until the lapse of {first time period+(first time period−second time period)} (=47 hours and 45 minutes) from the start of recording (NO at step S213), buffer C outputs, every time the amount of stored program data reaches a prescribed amount (YES at step S214), the stored program data to the first portion of unrecorded part of title C (step S215).

Next, at the time point when the set recording time (=26 hours) elapsed from the start of recording (YES at step S212) or when {first time period+(first time period−second time period)} (=47 hours and 45 minutes) elapsed from the start of recording (YES at step S213), buffer C outputs the stored program data to the first portion of un-recorded part of title B (step S216).

Figure 6A:
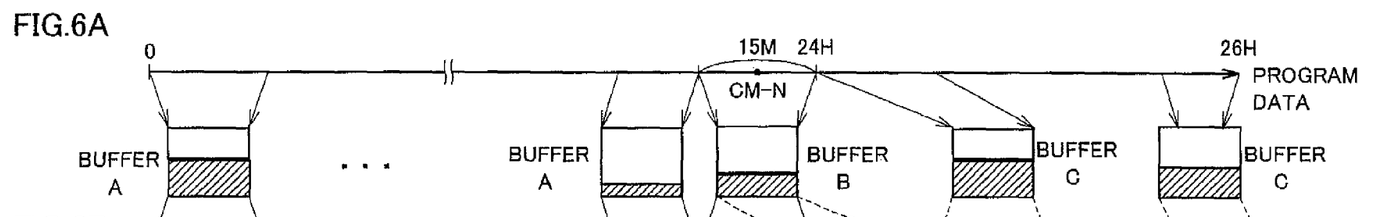
FIGS. 6A to 6D represent transition of program data stored in buffers A, B and C, program data recorded under titles A and B, title C formed by combining titles A and B and edited title C, respectively.
Figure 6B:
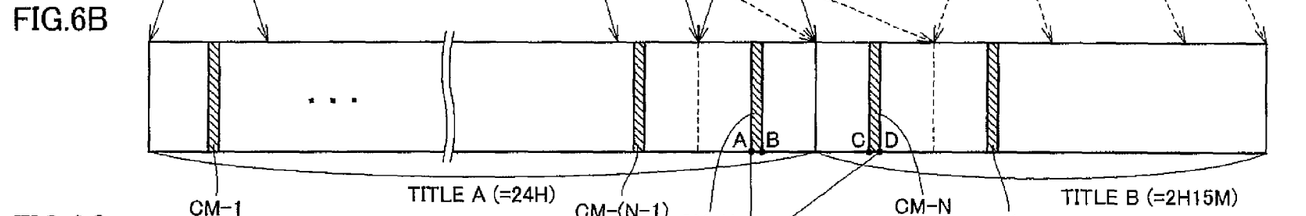

FIG. 6A shows transition of program data stored in buffers A, B and C. FIG. 6B shows program data recorded under titles A and B.

Referring to FIGS. 6A and 6B, until the lapse of 23 hours and 45 minutes from the start of recording, the program data is stored in buffer A. Every time the data reaches a prescribed amount, buffer A outputs the stored program data to the first portion of un-recorded portion of title A successively.

When 23 hours and 45 minutes passed from the start of recording, buffer A outputs the stored program data to the first portion of the un-recorded portion of title A, even when the amount of data has not yet reached the prescribed amount. From this time point, the program data comes to be stored in buffer B.

Until the lapse of 24 hours from the start of recording, buffer B outputs the stored program data to the first portion of un-recorded part of title A and also to the first portion of un-recorded part of title B, every time the data reaches the prescribed amount.

When 24 hours elapsed from the start of recording, buffer B outputs the stored program data to the first portion of un-recorded part of title A and also to the first portion of un-recorded part of title B even when the data has not yet reached the prescribed amount. Further, from this time point, program data comes to be recorded in buffer C.

Until the lapse of 26 hours, that is, the programmed recording time, from the start of recording, buffer C outputs the stored program data to the first portion of un-recorded part of title B every time the data reaches the prescribed amount.

When 26 hours elapsed from the start of recording, buffer C outputs the stored program data to the first portion of un-recorded part of title B even when the data has not yet reached the prescribed amount.

As a result of the foregoing operation, it follows that program data of 24 hours from the start of recording is recorded under title A, program data of 15 minutes from the lapse of 23 hours and 45 minutes from the start of recording as well as program data of 2 hours from the lapse of 24 hours from the start of recording, that is, program data of a total of 2 hours and 15 minutes, are recorded under title B. Therefore, the program data of 15 minutes from the lapse of 23 hours and 45 minutes from the start of recording is recorded both under title A and title B, in a redundant manner. Title A includes an N-th CM portion (CM-N) within 15 minutes from the end, and title B includes the N-th CM portion (CM-N) within 15 minutes from the start.

Again referring to FIG. 3, at step S103, combining unit 15 identifies the CM portion in the program data that is recorded in the redundant manner under title A and the CM portion in the program data that is recorded in the redundant manner under title B, and connects the portion immediately preceding the start of the CM portion of title A and the portion immediately succeeding the end of the CM portion of title B, to form title C. More specifically, combining unit 15 moves, in the storage unit 12, the data of title B such that data of the frame immediately following the end of the CM portion of title B is recorded immediately after the data of the frame immediately before the start of the CM portion of title A, whereby the new title C is formed.

Figure 6C:
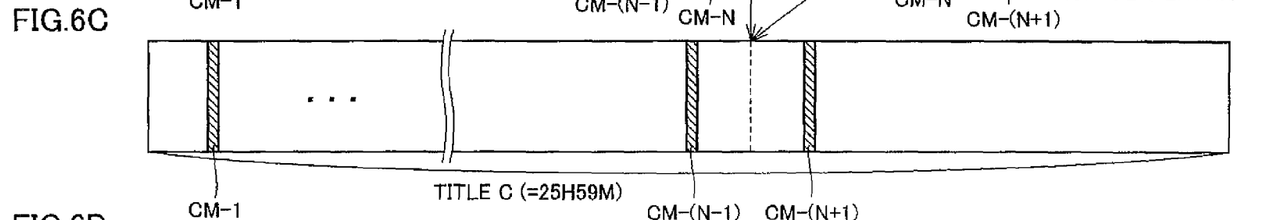

FIG. 6C represents title C formed by combining titles A and B.

Referring to FIG. 6C, the portion (A) immediately preceding the start of the N-th CM portion (CM-N) of the redundant portion of title A and the portion (D) immediately succeeding the end of the N-th CM portion (CM-N) of the redundant portion of title B are connected, and thus, title C is formed. Therefore, title C contains program data of 25 hours and 59 minutes, that is, the program data of 26 hours with CM portion (CM-N) of 1 minute removed.

Next, at step S104, editing unit 16 edits title C, by identifying CM portions of title C, removing the identified CM portions and closing the removed portions. More specifically, editing unit 16 moves, in storage unit 12, the data of title C such that immediately after the data of a frame immediately preceding the start of each CM portion of title C, data of a frame immediately succeeding the end of the CM portion is recorded.

Figure 6D:
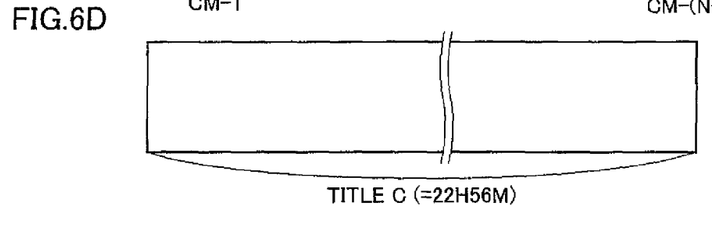

FIG. 6D shows title C after edition.

Referring to FIG. 6D, CM portions are removed from title C. When the title contains program data with 3 hours and 3 minutes of CM portions, title C after edition comes to contain program data of 22 hours and 45 minutes.

As described above, by the recording device in accordance with the embodiment of the present invention, when the time period that can be recorded under one title is limited within a prescribed time period and programmed recording over the time limit is designated, the program data is divided and recorded under two titles while providing a redundant portion, the two titles are combined based on the CM portion in the redundant portion, and from the thus combined title, CM portions are removed. Therefore, by the recording device in accordance with the embodiment of the present invention, recording without frame dropping becomes possible without wasting disk capacity.

(Modification)

The present invention is not limited to the embodiment described above, and it encompasses, for example, the following modification.

(1) Number of CMs in the Overlapping Portion

In the embodiment of the present invention, it has been assumed that the overlapping portion recorded redundantly under both titles A and B contains one CM portion. The overlapping portion may contain two or more CM portions. In that case, combining unit 15 identifies identical CM portions in the overlapping portion redundantly recoded under titles A and B, and connects the portion immediately preceding the start of the CM portion of title A to a portion immediately succeeding the end of the CM portion of title B, to form one title. As to the determination whether the CMs are identical, an ID, if any, contained in the data constituting the CM may be referred to for determination. Alternatively, when there are N CMs in the overlapping portion, the K-th CM in the overlapping portion of title A ($1 \leq K \leq N$) and the K-th CM of the overlapping portion of title B may be determined to be the identical CM.

Figure 7A:
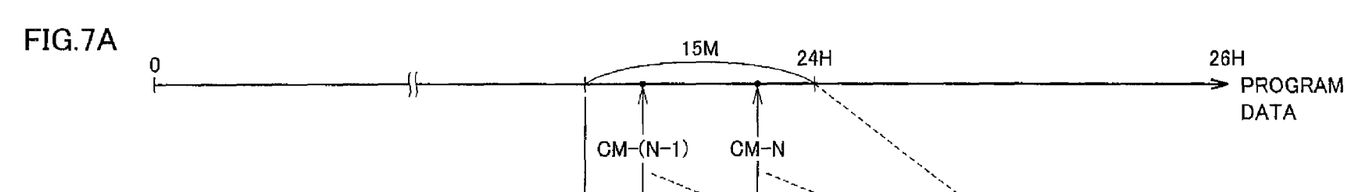
FIGS. 7A to 7C represent transition of program data stored in buffers, program data recorded under titles A and B, and title C formed by combining titles A and B.
Figures 7B, 7C:
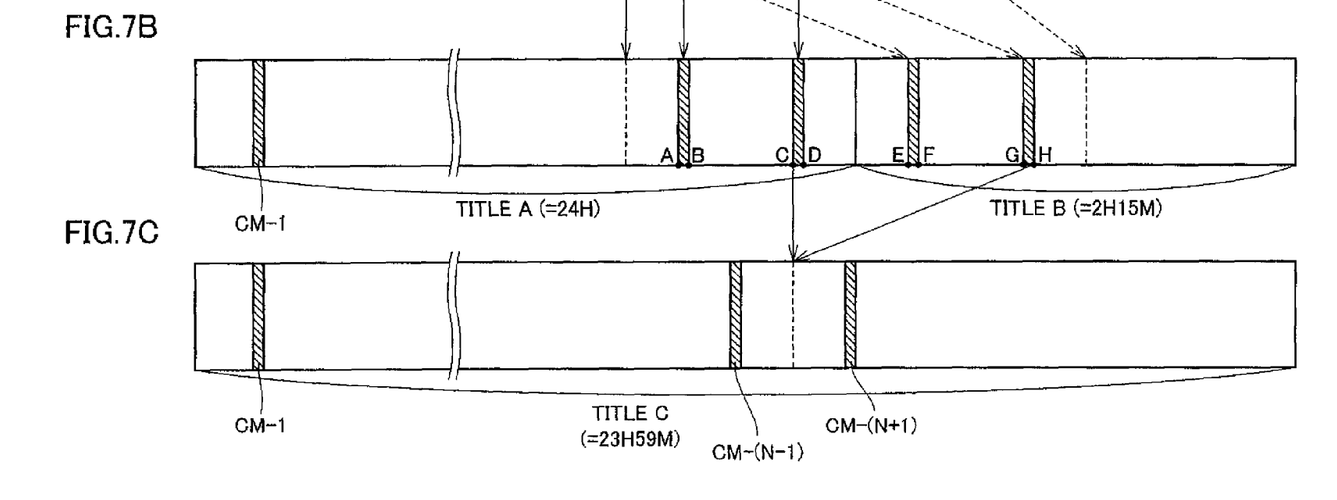

FIG. 7A shows transition of program data stored in the buffer. FIG. 7B shows program data recorded under titles A and B.

Referring to FIGS. 7A and 7B, the recorded data contains data of 15 minutes from the end of title A and data of 15 minutes from the start of title B recorded overlapped in a redundant manner. The overlapping portion of title A contains the (N−1)-th CM portion (CM-(N−1)) and the N-th CM portion (CM-N). The overlapping portion of title B contains the (N−1)-th CM portion (CM-(N−1)) and the N-th CM portion (CM-N).

FIG. 7C shows title C formed by combining titles A and B.

Referring to FIG. 7C, the portion (C) immediately preceding the start of N-th CM portion (CM-N) in the overlapping portion of title A is connected to the portion (H) immediately succeeding the end of N-th CM portion (CM-N) in the overlapping portion of title B, and thus, title C is formed.

(2) Cutting after Combination

In the embodiment of the present invention, when the time of program data recorded under the combined title exceeds the first time period, editing unit 16 identifies CM portions of the combined title, removes the identified CM portions and closes up the removed portions. This operation, however, is not limiting. By way of example, when the user designates a portion to be removed (for example, a drama that will not be viewed) through operation input unit 13, editing unit 16 may remove the designated portion and close up the removed portion. Alternatively, cutting of the CM portion in accordance with the embodiment of the present invention and cutting of the user-designated portion in accordance with the modification may both be performed. Alternatively, cutting of the CM portion in accordance with the embodiment of the present invention may be carried out first and if the time of program data recorded under the title still exceeds the first time period, the recording device may present a message to that effect, urging the user to designate a portion to be removed.

(3) Repetition

In the embodiment of the present invention, description has been given assuming that the programmed recording time is within the time period allowing recording under two titles, that is, the first time period+(the first time period−the second time period) (in the embodiment, 47 hours and 45 minutes). The recording time is not limited to this. Even when the programmed recording time exceeds this time period, recording in the similar manner is possible, using three or more titles.

(4) Buffers

Though three buffers A, B and C are used in the embodiment of the present invention, the number is not limiting, and only one buffer may be sufficient if frame dropping can be prevented at the time of switching the recording title from A to B.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A recording device in which time of program data to be recorded under one title is limited within a first time period, comprising:
   a receiving unit receiving the program data from a broadcast station;
   an operation input unit receiving a user operation;
   a storage unit having areas for storing at least two titles, and storing said received program data as data of either title;
   a recording control unit for recording, when the user sets programmed recording of a recording time longer than said first time period, the program data for said first time period from the start of recording time-sequentially under a first title, and recording the program data within said first time period minus a second time period, from the time point when said first time period elapsed from the start of recording, time-sequentially under a second title;
   a combining unit combining said first title and said second title to form one combined title; and
   an editing unit for making shorter the length of said combined title, if the time of program data recorded under said combined title exceeds said first time period;
   wherein said recording control unit records program data for said second time period from the time point the second time period before the lapse of said first time period from said start of recording, not only under said first title but also at a start portion of said second title;
   the program data received by said receiving unit includes CM portions, with time interval between said CM portions being equal to or shorter than said second time period;
   said combining unit identifies identical CM portions in the program data recorded redundantly under said first title and said second title, and forms said combined title by connecting a portion immediately preceding the start of said identified CM portion in said first title to a portion immediately succeeding the end of said identified CM portion in said second title;
   said editing unit identifies a CM portion of said combined title, removes said identified CM portion and closes up the removed portion; and
   said editing unit further removes, when the user designates a portion to be cut of said combined title through said operation input unit, said designated portion from said combined title and closes up said removed portion.

2. A recording device in which time of program data to be recorded under one title is limited within a first time period, comprising:
   a receiving unit receiving the program data from a broadcast station;
   an operation input unit receiving a user operation;
   a storage unit having areas for storing at least two titles, and storing said received program data as data of either title;
   a recording control unit for recording, when the user sets programmed recording of a recording time longer than said first time period, the program data for said first time period from the start of recording time-sequentially under a first title, and recording the program data within said first time period minus a second time period, from the time point when said first time period elapsed from the start of recording, time-sequentially under a second title;
   a combining unit combining said first title and said second title to form one combined title; and
   an editing unit for making shorter the length of said combined title, if the time of program data recorded under said combined title exceeds said first time period;
   wherein said recording control unit records program data for said second time period from the time point the second time period before the lapse of said first time period from said start of recording, not only under said first title but also at a start portion of said second title;
   the program data received by said receiving unit includes CM portions, with time interval between said CM portions being equal to or shorter than said second time period; and
   said combining unit identifies identical CM portions in the program data recorded redundantly under said first title and said second title, and forms said combined title by connecting a portion immediately preceding the start of said identified CM portion in said first title to a portion immediately succeeding the end of said identified CM portion in said second title.

3. The recording device according to claim 2, wherein said editing unit identifies a CM portion of said combined title, removes said identifies CM portion and closes up the removed portion.

4. The recording device according to claim 2, wherein said editing unit removes, when the user designated a portion to be cut of said combined title through said operation input unit, said designated portion from said combined title and closes up said removed portion.

5. A method of recording in a recording device in which time of program data to be recorded under one title is limited within a first time period, wherein
   said recording device includes a storage unit having areas for storing at least two titles, and storing said received program data as data of either title;
   said method comprising the steps of:
   receiving, from a broadcast station, program data including CM portions, with time interval between said CM portions being equal to or shorter than a second time period;
   recording, when the user sets programmed recording of a recording time longer than said first time period, the program data to a time point the second time period before the lapse of said first time period from the start of recording, time-sequentially under a first title;
   recording the program data for said second time period, from the time point the second time period before the lapse of said first time period from the start of recording, time-sequentially under the first title and time-sequentially under a second title;
   recording, from the time point when said first time period elapsed from the start of recording, the program data within said first time period minus the second time period, time-sequentially under said second title;
   identifying identical CM portions in the program data recorded redundantly under said first title and said second title, and forming one combined title by connecting a portion immediately preceding the start of said identified CM portion in said first title to a portion immediately succeeding the end of said identified CM portion in said second title; and editing to make shorter the length of said combined title, if the time of program data recorded under said combined title exceeds said first time period;

wherein at said editing step, a CM portion of said combined title is identified, said identified CM portion is removed and the removed portion is closed up, and when the user designates a portion to be cut of said combined title, said designated portion is removed from said combined title and said removed portion is closed up.

6. A method of recording in a recording device in which time of program data to be recorded under one title is limited within a first time period, wherein said recording device includes a storage unit having areas for storing at least two titles, and storing said received program data as data of either title;

said method comprising the steps of:

receiving, from a broadcast station, program data including CM portions, with time interval between said CM portions being equal to or shorter than a second time period;

recording, when the user sets programmed recording of a recording time longer than said first time period, the program data to a time point the second time period before the lapse of said first time period from the start of recording, time-sequentially under a first title;

recording the program data for said second time period, from the time point the second time period before the lapse of said first time period from the start of recording, time-sequentially under the first title and time-sequentially under a second title;

recording, from the time point when said first time period elapsed from the start of recording, the program data within said first time period minus the second time period, time-sequentially under said second title;

identifying identical CM portions in the program data recorded redundantly under said first title and said second title, and forming one combined title by connecting a portion immediately preceding the start of said identified CM portion in said first title to a portion immediately succeeding the end of said identified CM portion in said second title; and editing to make shorter the length of said combined title, if the time of program data recorded under said combined title exceeds said first time period.

7. The method of recording according to claim 6, wherein at said editing step, a CM portion of said combined title is identified, said identified CM portion is removed and the removed portion is closed up.

8. The method of recording according to claim 6, wherein at said editing step, when the user designated a portion to be cut of said combined title, said designated portion is removed from said combined title and said removed portion is closed up.

* * * * *

UNITED STATES PATENT AND TRADEMARK OFFICE
CERTIFICATE OF CORRECTION

PATENT NO. : 8,229,279 B2
APPLICATION NO. : 11/868196
DATED : July 24, 2012
INVENTOR(S) : Yasuyuki Kawanishi Page 1 of 1

It is certified that error appears in the above-identified patent and that said Letters Patent is hereby corrected as shown below:

In the Claims:

At column 10, claim number 3, line number 35, the word "identifies" should read -- identified --.

At column 10, claim number 4, line number 38, the word "designated" should read -- designates --.

Signed and Sealed this
Twenty-seventh Day of August, 2013

Teresa Stanek Rea
*Acting Director of the United States Patent and Trademark Office*